United States Patent [19]

Bravo

[11] Patent Number: 4,887,910
[45] Date of Patent: Dec. 19, 1989

[54] BLADE MIXER DEVICE FOR FLUID PRODUCTS CONTAINED IN A CYLINDRICAL TANK

[75] Inventor: Genesio Bravo, Alte Di Montecchio Maggiore, Italy

[73] Assignee: Bravo S.p.A., Vincenza, Italy

[21] Appl. No.: 188,962

[22] Filed: May 2, 1988

[30] Foreign Application Priority Data

May 8, 1987 [IT] Italy ................................ 20432 A/87

[51] Int. Cl.$^4$ ................................................ B01F 7/16
[52] U.S. Cl. ...................................... 366/312; 366/205; 366/314
[58] Field of Search ............... 366/205, 244, 247, 248, 366/249, 250, 279, 309, 311, 312, 314; 99/455

[56] References Cited

U.S. PATENT DOCUMENTS

| 1,468,826 | 9/1923 | Minney | 366/314 |
| 1,930,948 | 10/1933 | Brewer | 366/314 |
| 1,997,035 | 4/1935 | Arbuckle | 366/309 X |
| 2,191,830 | 2/1940 | Leedy | 366/314 |
| 2,579,874 | 12/1951 | Shaw | 366/247 |
| 2,731,809 | 1/1956 | Hackney | 366/312 |
| 3,958,968 | 5/1976 | Hosaka | 366/312 X |
| 4,392,361 | 7/1983 | Cavalli | 366/309 X |

FOREIGN PATENT DOCUMENTS

| 51478 | 8/1911 | Austria | 366/314 |
| 428536 | 7/1967 | Switzerland | 366/312 |

Primary Examiner—Harvey C. Hornsby
Assistant Examiner—Mark Spisich
Attorney, Agent, or Firm—Shlesinger, Fitzsimmons & Shlesinger

[57] ABSTRACT

A blade mixer device for liquid and/or doughy products contained in a cylindrical tank comprises a structure that supports at least a first and a second pair of blades acting, respectively, on the base and on the wall of the said tank; the bearing structure can moreover be associated in a removable manner with an operating shaft which extends coaxially with the tank. Characteristically, the said structure consists of a portal element restrained in a removable manner astride the top of the said operating shaft, to rotate together with it.

4 Claims, 2 Drawing Sheets

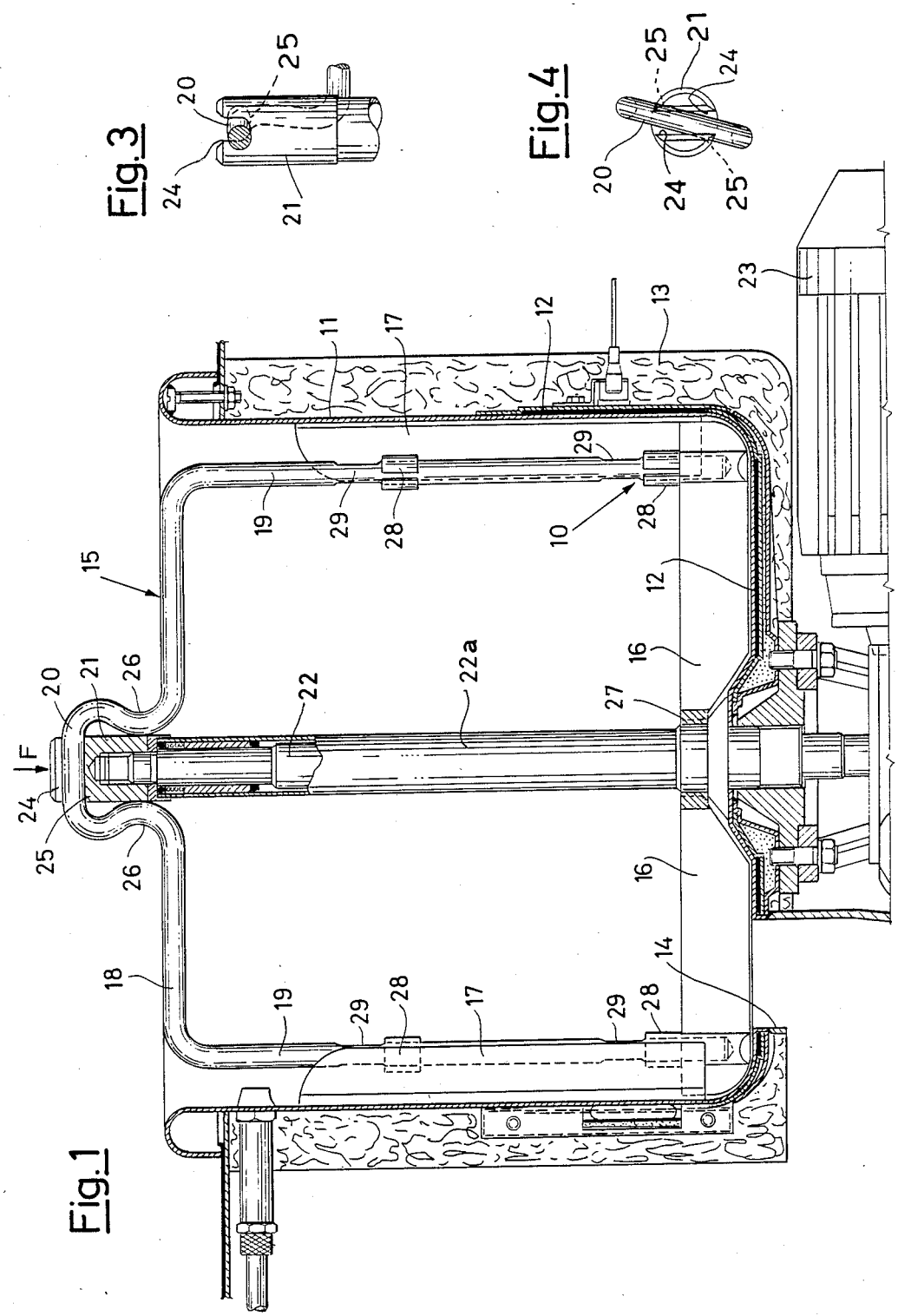

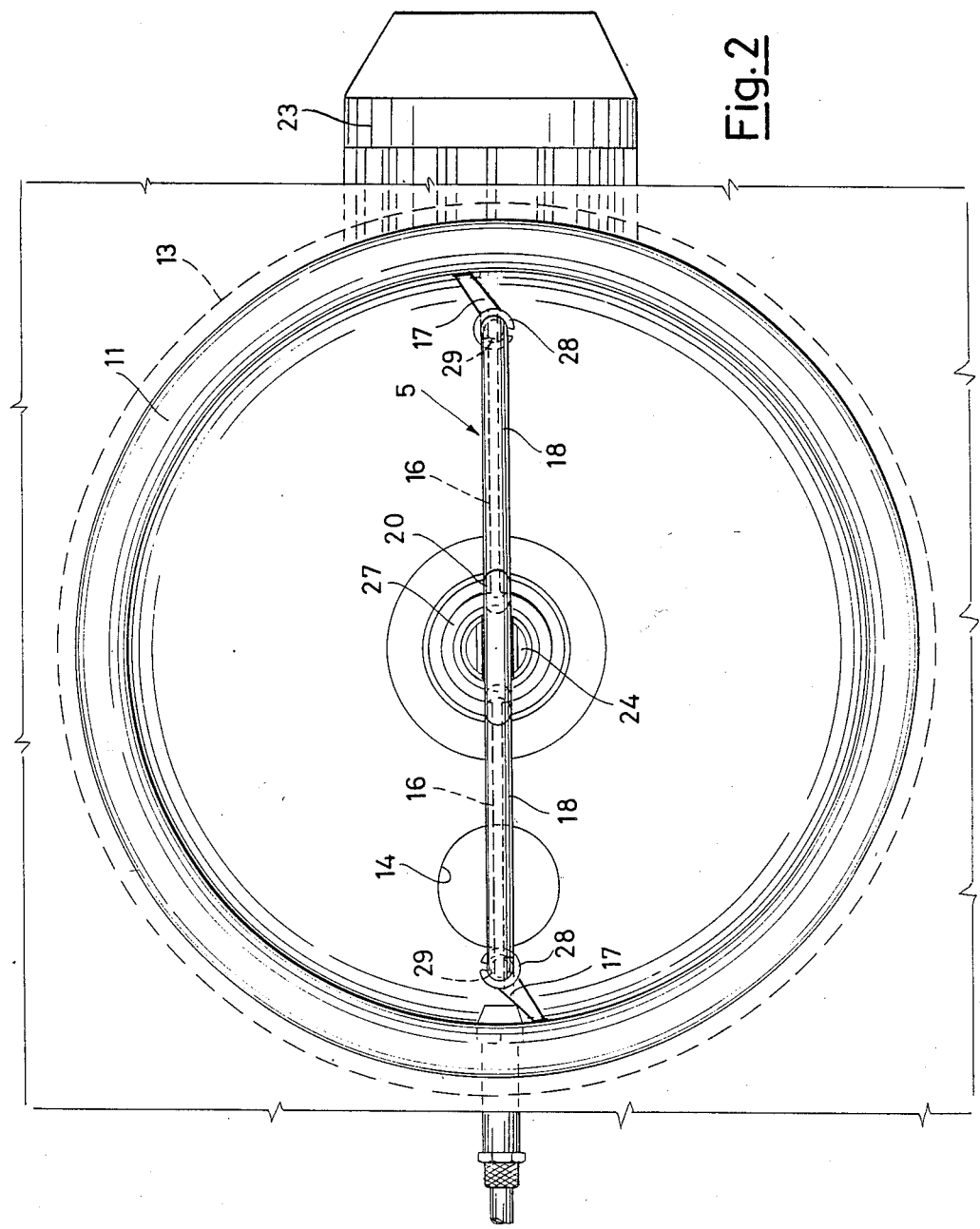

BLADE MIXER DEVICE FOR FLUID PRODUCTS CONTAINED IN A CYLINDRICAL TANK

The present invention relates to an improved blade mixer device for fluid products contained within a cylindrical tank.

The mixer device according to the invention is intended to be used, in particular but not solely, in connection with apparatus for producing good mixtures, such as those employed for preparing icecream and creams for confectioners.

As is well known to persons with ordinary skill in the art, the basic products for preparing icecream and confectionery creams have to be adequately mixed and pasteurized, these operations being performed within a heatable stainless steel tank provided with a blade mixer device.

The said mixer device has a twofold purpose: firstly, it must assure a total mixing of the mix, at the same time preventing it from becoming attached to the hot wall of the tank, which would damage its organoleptic properties.

The mixer device must therefore be of a structure that meets the above requisites, and that assures that the blade mounting system, especially for the blades that scrape the shell of the tank, is such as to avoid distortions of the blades, which can occur if dense mixtures are being processed; any distortions of the blades lead to an inefficient scraping action of the blades on the wall of the tank.

In addition, the mixer device must have a structure that can be readily separated from the tank, especially for purposes of washing, and that does not have areas difficult to reach in which mixture residues can gather; if not totally removed, such residues are a source of undesirable germs and bacteria.

Further, the overall structure of the mixer should be such as to allow it to be manufactured very economically indeed, without complicated jointing systems between the different parts and without employing costly and burdensome casting operations.

As the currently available mixer devices do not fully satisfy the foregoing requirements, the overall object of the present invention is to obviate the drawbacks of the known art by embodying a mixer that has all the aforesaid desirable characteristics.

To achieve the said object, the invention embodies a blade mixer device for liquid and/or doughy fluid-type products contained in a cylindrical tank, of the type comprising: a structure bearing at least a first and second pair of blades acting respectively on the base and on the wall of the said tank, the said structure being removably associated with an operating shaft extending axially to the tank, wherein the said structure comprises at least a portal element restrained removably astride the top of the said operating shaft, to rotate together with it.

Preferably, the said portal element consists of a shaped metallic rod to which the said blades are restrained.

The functional and structural characteristics of the invention, and its advantages over the kwnown art, will become more apparent from an examination of the following description, referred to the appended drawings which show an example of a mixer embodied according to the principles of the invention. In the drawings:

FIG. 1 is a partially sectioned elevational view of the mixer device of the invention applied, by way of illustrative and not limiting example, to the mixing and pasteurization tank of a machine for the production of a mixture for the preparation of icecrem and confectionery creams;

FIG. 2 is a plan view taken on the arrow F of FIG. 1; and

FIGS. 3 and 4 are particulars.

With reference to the drawings, the mixer device in question is indicated overall by numeral 10 and is mounted within a stainless steel tank 11 with electrical heating resistances 12 and with a cladding 13 made of insulant material.

The general structure of the tank 11 is not here described or illustrate in greater detail since it can be of any type known to persons with ordinary skill in the art, for example that adopted in pasteurizers of mixtures for producing icecream.

If the mixer device of the invention is used in connection with a so-called "total" unit for producing Italian-style hand-made icecream (the said unit existing on the market under the registered trademark "TRITTICO"), in other words capable of performing the three functions of mixing, pasteurization and whipping the product, the tank 11 has on its base an opening 14 for discharge of the mixed and pasteurized mixture into an underlying whipper (not shown).

A unit machine of this type is for example illustrated and described in Italian patents 996102 of Dec. 28, 1973 and 1055984 of Feb. 18, 1976, to which reference may be had in respect of the relevant technology.

According to the invention, the mixer device 10 consists structurally of a portal element 15 constructed in a straightforward and rapid manner by bending a suitably shaped stainless steel rod, as is clearly shown in the drawings, and bearing two pairs of blades 16, 17, acting respectively in the vicinity of the flat bottom wall or the base of the annular side wall of the tank 11.

More specifically, the portal element 15 features a horizontal top portion 18 connected to two opposed lateral uprights 19.

The portion 18 extends generally diametrally across the upper end of tank 11 and has the central or mid portion thereof shaped as an inverted U or a saddle 20, so as to be applied astride—in a freely removable manner- the top head 21 of an operating shaft 22 which projects from a sleeve 22a extending coaxially within the tank 11 solidly with it; the said shaft 22 is adapted to be rotated by means of a geared motor 23. To such end the head 21 features a first upper transversal grooving 24 for introducing the saddle 20, which terminates in a second grooving 25 staggered vis-a-vis the first grooving 24, for locking the mixer 10 into position, the said mixer 10 being entrained into rotation together with the shaft 22.

As FIG. 1 of the drawings clearly shows, the saddle 20 features lateral bends 26 which rest against the head 21 of the shaft 22.

To the base of lower ends of of the lateral, opposite uprights 19 of the portal element 15 are fixed the outer ends of the blades 16, which are diametrically opposite each other, the inner ends of which terminate in a centering and anti-friction bush 27 inserted at the base of the sleeve 22a. The blades 17, on the other hand, are inserted on the uprights 19 of the portal 15, in a freely oscillating manner, each by means of a pair of interspaced split-rings 28. For the purpose of demounting the said blades 17 from the portal element 15, the uprights 19 have formed thereon just above the split rings 28 tapered, smaller diameter portions 29, proximal to which the split rings 28 can be brought in order to allow radial removal of the blades 17.

From what has been described above with reference to the appended drawings, it will be evident that the mixer device of the invention will satisfy the requirements mentioned in the introductory part of the specification.

In particular, the mixer device of the invention can be manufactured at extremely low cost, since it consists simply of a shaped stainless steel rod to which the two pairs of blades 16, 17 are restrained.

In addition, as a resut of its structure, the mixer is readily removable from the tank for washing purposes and has no nooks or crannies difficult to reach during washing and cleaning where residues of mixture can accumulate.

Lastly, the scraping blades 17 are carried by the respective uprights 19 which behave as a girder supported at the ends, so as to guarantee, even under considerable forces, maintenance of the original trim of the blades 17 which are thus able to perform for all types of mixture, more or less dense, an effective scraping action on the annular side wall of the tank 11. This cannot be achieved with known mixer devices, in which the scraper blades are mounted on overhung pins.

I claim:

1. A blade mixer device for fluid products contained within a cylindrical tank of the type having therein an axially extending operating shaft, comprising
   a portal element removably mounted on said operating shaft, and supporting at least a first and a second pair of blades acting, respectively, on the bottom wall and the annular side wall of said tank,
   said portal element having an upper horizontal section the mid portion of which is shaped as a saddle,
   said operating shaft having a grooved head fixed to the top thereof,
   said saddle being removably engaged with a pair of grooves formed transversely in said head in staggered relation one with respect to the other, whereby said saddle is removably restrained on said head by said grooves, and
   said saddle including diametrally opposed, lateral bends which rest against said head.

2. Device as described in claim 1, wherein the said portal element comprises a shaped metal rod to which said blades are restrained.

3. A device as defined in claim 1, wherein
   said portal element has projecting downwardly from opposite ends of said upper section thereof a pair of uprights,
   a bushing is rotatably mounted on said shaft adjacent said bottom wall of said tank, and
   said first pair of blades extend substantially diametrally of said tank adjacent the lower end thereof, and each blade of said first pair thereof being fixed at one end to one of said uprights, and at its opposite end to said bushing for rotation coaxially of the axis of said operating shaft.

4. A device as defined in claim 3, wherein
   each of said second pair of blades is supported at one end thereof by a pair of split rings on one of said uprights, and
   each of said uprights has reduced-diameter portions thereof positioned above said split rings to enable insertion and removal of said split rings from the associated upright, when said split rings are in registry with said reduced-diameter portions.

* * * * *